US006980280B2

(12) United States Patent
Roddy et al.

(10) Patent No.: US 6,980,280 B2
(45) Date of Patent: Dec. 27, 2005

(54) TWO LEVEL IMAGE WRITER

(75) Inventors: James E. Roddy, Rochester, NY (US); Robert J. Zolla, Rochester, NY (US); Richard L. Druzynski, East Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 886 days.

(21) Appl. No.: 09/976,171

(22) Filed: Oct. 12, 2001

(65) Prior Publication Data

US 2003/0071888 A1  Apr. 17, 2003

(51) Int. Cl.[7] .............. G03B 27/32; G03B 27/44; G03B 27/54; G03B 21/00; G03B 21/26
(52) U.S. Cl. .............. 355/67; 355/32; 355/46; 353/30; 353/31; 353/33
(58) Field of Search .............. 355/32, 46, 67, 355/71; 353/30, 31, 33, 34, 37

(56) References Cited

U.S. PATENT DOCUMENTS

| | | | |
|---|---|---|---|
| 4,728,965 A | 3/1988 | Kessler et al. | |
| 5,061,049 A | 10/1991 | Hornbeck | |
| 5,325,137 A | 6/1994 | Konno et al. | |
| 5,461,411 A | 10/1995 | Florence et al. | |
| 5,521,748 A | 5/1996 | Sarraf | |
| 5,652,661 A | 7/1997 | Gallipeau et al. | |
| 5,701,185 A | 12/1997 | Reiss et al. | |
| 5,743,610 A | 4/1998 | Yajima et al. | |
| 5,743,612 A | 4/1998 | Matsuda et al. | |
| 5,745,156 A | 4/1998 | Federico et al. | |
| 5,798,819 A * | 8/1998 | Hattori et al. | 353/33 |
| 5,805,274 A | 9/1998 | Saita | |
| 5,808,800 A | 9/1998 | Handschy et al. | |
| 5,883,681 A * | 3/1999 | Kono et al. | 348/751 |
| 6,046,858 A * | 4/2000 | Scott et al. | 359/634 |
| 6,174,060 B1 * | 1/2001 | Imaoka et al. | 353/31 |
| 6,215,547 B1 | 4/2001 | Ramanujan et al. | |

FOREIGN PATENT DOCUMENTS

EP    1 193 525 A2    4/2002
WO   WO 98/20475 A1   5/1998

\* cited by examiner

Primary Examiner—Rodney Fuller
(74) Attorney, Agent, or Firm—Nelson Adrian Blish

(57) ABSTRACT

A two level image writer (10) forms an image from digital data onto a photosensitive medium. A first level illumination system has a first source (20) for emitting a first polarized light beam having a first color; a second source (22) for emitting a second polarized light beam having a second color; and a third source (26) for emitting a third polarized light beam having a third color. A fold mirrors directs each beam to a second level. Three polarizing beamsplitters (73, 75, 77) on the second level receive the polarized beams from the fold mirrors and isolate polarization states of each of the first, second, and third polarized light beam. Three spatial light modulators (90, 95, 97) on the second level modulate the first, second, and third polarized light beam from the polarizing beamsplitter prisms to form an array of image pixels according to said digital data. A diechroic combiner (86) combines the three modulated light beams.

23 Claims, 6 Drawing Sheets

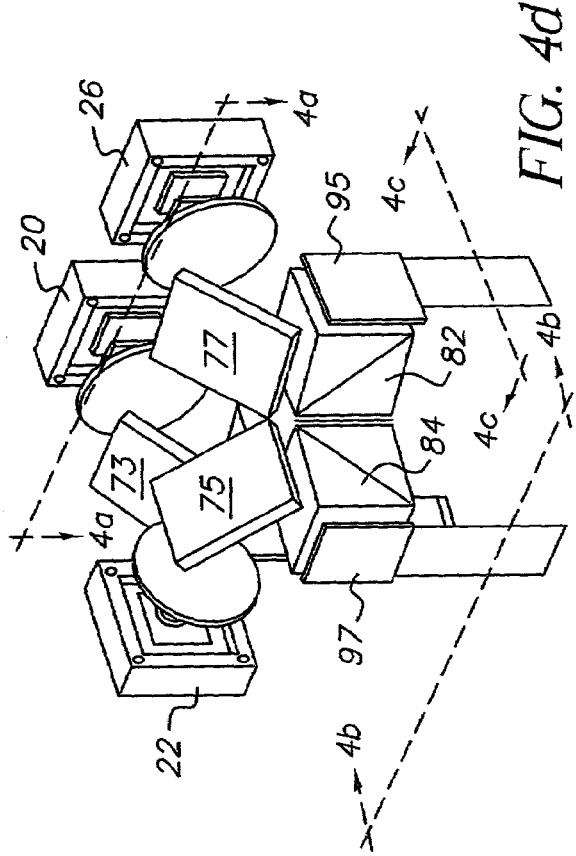
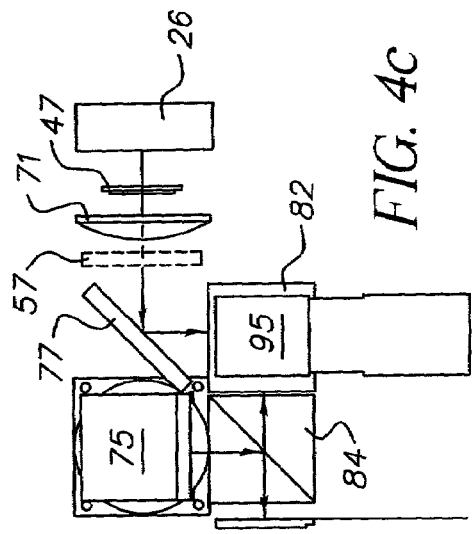
FIG. 4d
FIG. 4c
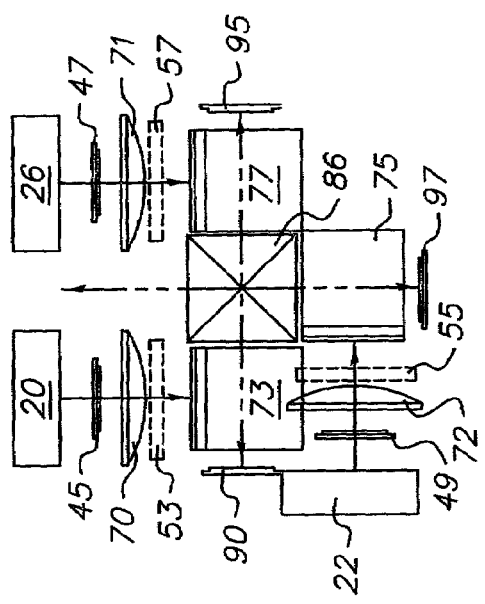
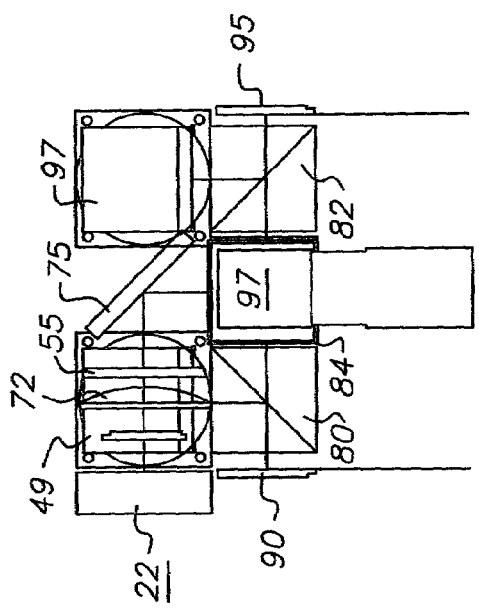
FIG. 4a
FIG. 4b

TWO LEVEL IMAGE WRITER

CROSS REFERENCE TO RELATED APPLICATIONS

Reference is made to commonly-assigned copending U.S. patent application Ser. No. 09/794,669, filed Feb. 27, 2001, entitled METHOD AND APPARATUS FOR PRINTING HIGH RESOLUTION IMAGES USING MULTIPLE REFLECTIVE SPATIAL LIGHT MODULATORS, by Ramanujan et al., the disclosure of which is incorporated herein.

FIELD OF THE INVENTION

This invention relates generally to a method for spatially and temporally modulating a light beam and more specifically to forming a high resolution image on photosensitive media using multiple spatial light modulators.

BACKGROUND OF THE INVENTION

Image recording systems write digital data onto photosensitive media by applying light exposure energy. Such energy may originate from a number of different sources and may be modulated in a number of different ways. Image recording systems can be used for digital printing, whereby digital image data is used to print an image onto photographic paper or film. This invention specifically relates to the high speed (multiple frames per second) writing of digital image data onto 35 mm color movie film.

One of the early methods used for digital printing onto movie film was cathode ray tube (CRT) based systems. In a CRT-based printer, the digital data is used to modulate the CRT, which provides exposure energy by scanning an electron beam of variable intensity along a phosphorescent screen. This technology has several limitations related to the phosphor and the electron beam. The resolution of this technology is limited to approximately 1000 pixels across the film, perforation to perforation, which roughly corresponds to 1000 DPI (dots per inch). CRT printers also tend to be expensive, which is a severe shortcoming in cost sensitive markets such as photoprocessing and film recording. An additional limitation is that CRT printers can only operate at rates of about one minute per frame. Although this may be acceptable for small segments of special effects, it is far too slow for digital editing and enhancement of entire feature length films.

Another commonly used approach to digital printing is the laser-based engine shown in U.S. Pat. No. 4,728,965. Digital data is used to modulate the duration of laser on-time or intensity as the beam is scanned by a rotating polygon onto the imaging plane. Such raster scan systems use red, green, and blue lasers. Unfortunately, as with CRT printers, the laser based systems tend to be expensive, since the cost of blue and green lasers remains quite high. Additionally, compact lasers with sufficiently low noise levels and stable output so as to allow for accurate reproduction of an image without introducing unwanted artifacts are not widely available. Commercially available laser scanner systems tend to write images onto movie film in the range of 3 to 10 seconds per frame and have been used primarily for special effects lasting only tens of seconds. For digital mastering of full length feature films, a throughput of about 2 frames per second is needed.

Another problem with laser based printing system is that both photographic paper and film are often not suitable for a color laser printer due to reciprocity failure. High intensity reciprocity failure is a phenomenon by which both photographic paper and film are less sensitive and have reduced contrast when exposed to high light intensity for a short period. For example, raster scan laser printers expose each of the pixels for tens of nanoseconds, whereas optical printing systems expose the paper for the duration of the whole frame time, which can be on the order of a second. Thus, special paper and film are required for laser printers.

In an effort to reduce cost and complexity of printing systems, avoid reciprocity failure, and increase the throughput of the writer, alternative technologies have been considered for use in digital printing. Among suitable candidate technologies under development are two-dimensional spatial light modulators. Two-dimensional spatial light modulators, such as the digital micromirror device (DMD) from Texas Instruments, Dallas, Tex., or liquid crystal devices (LCD) can be used to modulate an incoming optical beam for imaging. A spatial light modulator is essentially as a two-dimensional array of light-valve elements, each element corresponding to an image pixel. Each array element is separately addressable and digitally controlled to modulate light by transmitting or by blocking transmission of incident light from a light source. A liquid crystal spatial light modulator does this by changing the polarization state of light. Polarization considerations are, therefore, important in the overall design of support optics for a spatial light modulator.

There are two basic types of LCD spatial light modulators in current use. The first type developed was the transmission spatial light modulator, which, as its name implies, operates by selective transmission of an optical beam through individual array elements. The second type, a later development, is a reflective spatial light modulator. The reflective spatial light modulator, operates by selective reflection of an optical beam through individual array elements. A suitable example of an LCD reflective spatial light modulator relevant to this application utilizes an integrated complementary metal oxide semiconductor (CMOS) backplane, allowing a small footprint and improved uniformity characteristics.

Spatial light modulators provide significant advantages in cost, as well as avoiding reciprocity failure. Spatial light modulators have been proposed for a variety of different printing systems, from line printing systems such as the printer depicted in U.S. Pat. No. 5,521,748, to area printing systems such as the system described in U.S. Pat. No. 5,652,661.

A single spatial light modulator such as a Texas Instruments digital micromirror device (DMD) as shown in U.S. Pat. No. 5,061,049 can be used for digital printing applications. One approach to printing using the Texas Instruments DMD, shown in U.S. Pat. No. 5,461,411, offers advantages such as longer exposure times compared to laser/polygon writers. Thus, the reciprocity problems associated with photosensitive media during short periods of light exposure are eliminated. However, DMD technology is both expensive and not widely available. Furthermore, DMDs are not easily scaleable to higher resolutions, and the currently available resolution is not sufficient for all digital printing needs.

Several photographic printers using commonly available LCD technology are described in U.S. Pat. Nos. 5,652,661; 5,701,185; and 5,745,156. Most of these designs involve the use of a transmissive LCD modulator such as those depicted in U.S. Pat. Nos. 5,652,661 and 5,701,185. While such methods offer several advantages in ease of optical design for printing, there are several drawbacks to the use of conventional transmissive LCD technology. Transmissive LCD modulators generally have reduced aperture ratios and the use of transmissive field-effect-transistors (TFT) on glass technology does not promote the pixel to pixel uniformity desired in many printing and film recording applications. Furthermore, in order to provide large numbers of pixels, many high resolution transmissive LCDs posses footprints of several inches. Such a large footprint can be unwieldy when combined with a lens designed for printing or film recording applications. As a result, most LCD printers using transmissive technology are constrained to either low resolution or small print sizes.

To print high resolution images with at least 2000 pixels per inch requires 2000×1500 pixels, and can require as much as 4000×3000 pixels. Transmissive LCD modulators with such resolution are not readily available. Furthermore, each pixel must have a gray scale depth to render a continuous tone print uniformly over the frame size, which is not available with this technology.

The use of a reflective LCD serves to significantly reduce the cost of the printing system. Furthermore, the use of an area reflective LCD modulator sets the exposure times at sufficient length to avoid or significantly reduce reciprocity failure. Exposure times for individual pixels shift from tens of nanoseconds to tens of milliseconds, a million-fold increase. A modest increase in the throughput of the writer to two frames per second will still be well within reciprocity boundaries.

The progress in the reflective LCD device field made in response to needs of the projection display industry have provided opportunities in printing applications. Thus, a reflective LCD modulator designed for projection display can be incorporated into a printing design with little modification to the LCD itself. Also, by designing an exposure system and data path with an existing projection display device allows incorporation of an inexpensive commodity item into the print engine.

Of the reflective LCD technologies, the most suitable to this design is the one that incorporates a small footprint with an integrated CMOS backplane. The compact size along with the uniformity of drive offered by such a device will translate into better image quality than other LCD technologies. There has been progress in the projection display industry towards incorporating a single reflective LCD, primarily because of the lower cost and weight of single device systems. See U.S. Pat. No. 5,743,612. Of the LCD technologies, the reflective LCD with a silicon backplane can best achieve the high speeds required for color sequential operation. While this increased speed may not be as essential to printing as it is for projection display, the higher speeds can be utilized to incorporate additional gray scale and uniformity correction to printing systems.

The recent advent of high resolution reflective LCDs with high contrast, greater than 100:1, presents possibilities for printing that were previously unavailable. See U.S. Pat. Nos. 5,325,137 and 5,805,274. Specifically, a printer may be based on a reflective LCD modulator illuminated by filtered lamps, lasers, or by an array of red, green, and blue light emitting diodes. The reflective LCD modulator may be dithered in two directions to increase the resolution. Thus, a 2000×1500 modulator can be dithered to achieve an image of 4000×3000, equivalent to the best output of the laser writers. Settling times on some modulators are of the order of one-sixtieth of a second or less, allowing possible printing speeds of tens of frames per second.

Reflective LCD modulators have been widely accepted in the display market. Most of the activity in reflective LCD modulators has been related to projection display, such as is disclosed in U.S. Pat. No. 5,325,137. Several projector designs use three reflective LCD modulators, one for each of the primary colors. One such design is shown in U.S. Pat. No. 5,743,610.

It is instructive to note that imaging requirements for projector and display use (as is typified in U.S. Pat. Nos. 5,352,137; 5,808,800; and 5,743,610) differ significantly from imaging requirements for digital printing onto photographic paper or film. Projectors are optimized to provide maximum luminous flux to a screen, with secondary emphasis placed on characteristics important in printing, such as contrast and resolution. To achieve the goals of projection display, most optical designs use high intensity lamp light sources. Optical systems for projector and display applications are designed for the response of the human eye, which, when viewing a display, is relatively insensitive to image artifacts and aberrations and to image non-uniformity. However, when viewing printed output from a high-resolution printing system, the human eye is not nearly as forgiving to artifacts and aberrations and to nonuniformity, since irregularities in optical response are more readily visible and objectionable on printed output. In fact, the gamma of the human eye and brain system, when viewing images in a darkened room is approximately 0.8, rather than a gamma of 1.0 when viewing a print in a well lit room. The gamma associated with a color intermediate negative may be 1.0, and as high as 4.0 on the release print, thus rendering small artifacts more easily visible in high contrast printed images. For this reason, there can be considerable complexity in optical systems for providing uniform exposure energy for printing. Even more significant are differences in resolution requirements. Additionally, projectors are often designed to present motion images. When an image is moving, the presence of defects and artifacts may be dynamic. Between the varying image content and the motion of the artifacts themselves, image variations may not be easily perceived by the human eye. However, when the artifacts are stationary as is the surrounding image data, image quality requirements become more stringent. Digitally rendered movie images, both negative and positive, are typically inspected under a 200× microscope as well as projected onto a screen before approval is given.

A preferred approach for digital printing onto photographic film uses a reflective LCD-based spatial light modulator. Liquid crystal modulators can be a low cost solution for applications requiring spatial light modulators. Photographic printers using commonly available LCD technology are disclosed in U.S. Pat. Nos. 5,652,661; 5,701,185; and 5,745,156. Although the present invention primarily addresses use of reflective LCD spatial light modulators, references to LCDs in the subsequent description can be generalized, for the most part, to other types of spatial light modulators, such as the previously noted Texas Instruments DMD device.

Primarily because of their early development for and association with screen projection of digital images, spatial light modulators have largely been adapted to continuous tone (contone) color imaging applications. Unlike other digital printing and film recording devices, such as the CRT and laser-based devices mentioned above that scan a beam in a two-dimensional pattern, spatial light modulators image one complete frame at a time. Using an LCD, the total exposure duration and overall exposure energy supplied for a frame can be varied as necessary in order to achieve the desired image density and to control media reciprocity characteristics. Advantageously, for printing onto photographic paper and film, the capability for timing and intensity control of each individual pixel allows a LCD printer to provide grayscale imaging.

A single reflective LCD can be used in a color printer by sequentially exposing the LAD to red, green, and blue light while synchronously and sequentially altering the image data and setup parameters sent to the modulator. Such a printer is described in U.S. Pat. No. 6,215,547. The problem with using a single LCD is that the throughput for sequential exposure is lower than simultaneous exposure by a factor of three, the number of exposing colors. The market is trending for the digitization of camera negatives of most feature length movies, not just the special effects portions of a few seconds to a few minutes. Many more frames must then be written out. The speed of the printer in terms of the number of frames per second must increase. The demand for higher speed printers calls for the use of three LCD chips, one for red, one for green, and one for blue. Film frames can then be exposed simultaneously, effectively tripling the printing speed.

It is advantageous to have independent red, green, and blue sources in a writer. LEDs of different colors are typically made of different materials and exhibit different forward voltage drops, requiring separate power supplies. If modest sized (75 watt) tungsten lamps with narrow band filters are used, the power output of the lamps can be individually adjusted to compensate for aging by adjusting the DC lamp current. A change of a few volts in the lamp drive can result in a change of 2:1 in light output. This adjustment can be used to compensate for lamp aging. U.S. Patent application Ser. No. 09/794,669 describes an embodiment where three light sources are used with three reflective LCDs and are contained in a single plane parallel to the mounting tabletop in a low cost paper printer. Depending upon the polarization state used, this writer may be limited in contrast if the alternate (low contrast) side of the beamsplitter prism is used (s-polarized), or may require an expensive, custom x-cube if the nominal high contrast side of the beamsplitter prism is used (p-polarized). JVC LCD-based projectors also confine all the optics to a single plane, perpendicular to the mounting tabletop in this case, but use the high contrast side of the polarizing beamsplitter prism. The p-polarized beam is converted to an spolarized beam in each color, before entering the x-cube, by a half wave plate. These half wave plates must be large and very flat because they are used in the high resolution imaging side of the optical systems and are therefore very expensive. Three are required per projector.

Movie film (intermediate negative) typically requires a dynamic exposure range of 100:1 to achieve a density range of 2.0, which then implies a contrast or extinction ratio of at least 100:1 from the LCD spatial light modulator. Paper prints, with a gamma as high as 2.5, require a dynamic exposure range of only 10:1 or less. Polarizing beamsplitter prisms typically have one side or selected polarization that provides a higher contrast or extinction ratio than the alternate side. It is desirable to use the high contrast side of the polarizing prism for a movie film writer. It is further desirable to have s-polarized light entering the x-cube combiner for all colors, so that a non-custom x-cube can be used and an output analyzer can be used after the x-cube to enhance contrast further. Keeping the optical axis parallel to the tabletop will allow ease of assembly in a low volume package and can be made relatively immune to vibration.

Thus, it is desirable to have a low-cost, high-resolution, high-speed method for digital printing onto a photosensitive media that provides high contrast, low cost standard components, avoids reciprocity failure, is confined to a minimal physical size, rugged, and immune to the effects of vibration.

SUMMARY OF THE INVENTION

It is an object of the present invention to provide a method and apparatus for printing images onto a photosensitive media using multiple reflective spatial light modulators. It is another object of the invention to provide for a high pixel density image at the photosensitive media exposure plane. It is a further object of the invention to provide a sufficiently high contrast for writing on motion picture film while minimizing the cost, complexity, and volume of the writer. It is a further object of the invention to provide increased throughput in terms of the number of frames per second written by providing multiple independent light sources and simultaneous exposure by using multiple modulators. The present invention is directed at overcoming one or more of the problems set forth in the background of the invention.

Briefly, according to one aspect of the invention, imaging light from at least one light source is imaged through at least one uniformizing optics assembly and at least one polarizing beamsplitter element to create a telecentric illumination at each of at least one reflective spatial light modulator (SLM) in a digital printing system. The reflective spatial light modulators are comprised of a plurality of modulator sites in a two dimensional array. Upon being addressed with image data signals, the reflective spatial light modulators modulate the polarized illumination light on a site by site basis and reflect the modulated light back through the polarized beamsplitting elements. The modulated light beams are combined to form an image, which is directed through a print lens to expose a photosensitive media. The optics is constructed such that the first plane or level of the writer apparatus contains the individual light sources, illumination optics, and fold mirrors or prisms. A second plane or level of the recorder contains the polarization beamsplitting prisms, the SLM modulators, the x-cube combiner, the print lens, and the photosensitive media.

According to another aspect of the present invention, a first reflective spatial light modulator is illuminated in a telecentric manner by a first light component, a second reflective spatial light modulator is illuminated in a telecentric manner by a second light component, and a third reflective spatial light modulator is illuminated in a telecentric manner by a third light component.

It is a further object of the invention to provide high contrast images using s-polarized light with respect to the polarization beamsplitter prism and also for the x-cube combiner without the use of half wave plates or nonstandard x-prisms or non-standard beamsplitter prisms.

In another aspect of the invention, the light sources are oriented radially outwards with respect to the x-cube, greatly reducing the possibility of mechanical interference between light sources, while still maintaining s-polarized light with respect to the polarization beamsplitter prisms and the x-cube.

In another aspect of the invention, the fold mirrors are eliminated and the light sources are mounted vertically, reducing possible mechanical interference between light sources and allowing hot sources to be kept further from the optics and to be cooled more easily. This configuration allows for the smallest footprint.

The illumination system is described with particular reference to a preferred embodiment utilizing LEDs as the light source. It is understood that alternative light sources, such as lasers or filtered xenon or tungsten lamps, or combinations of these sources, and modifications thereof can be effected within the scope of the invention.

The invention and its objects and advantages will become more apparent in the detailed description of the preferred embodiment presented below.

BRIEF DESCRIPTION OF THE DRAWINGS

FIG. 4a is a top view of a two level printer, wherein the illumination optics are oriented outward from the x-cube combiner.

FIGS. 4b and 4c are side views of a two level printer, wherein the illumination optics are oriented outward from the x-cube combiner.

FIG. 4d is a three-dimensional view of a two level printing system showing three reflective LCD modulators and x-cube combiner in one plane, and three independent light sources in a second plane.

DETAILED DESCRIPTION OF THE INVENTION

The present invention will be directed in particular to elements forming part of, or in cooperation more directly with, the apparatus in accordance with the present invention. It is to be understood that elements not specifically shown or described may take various forms well know to those skilled in the art.

Figure 1:
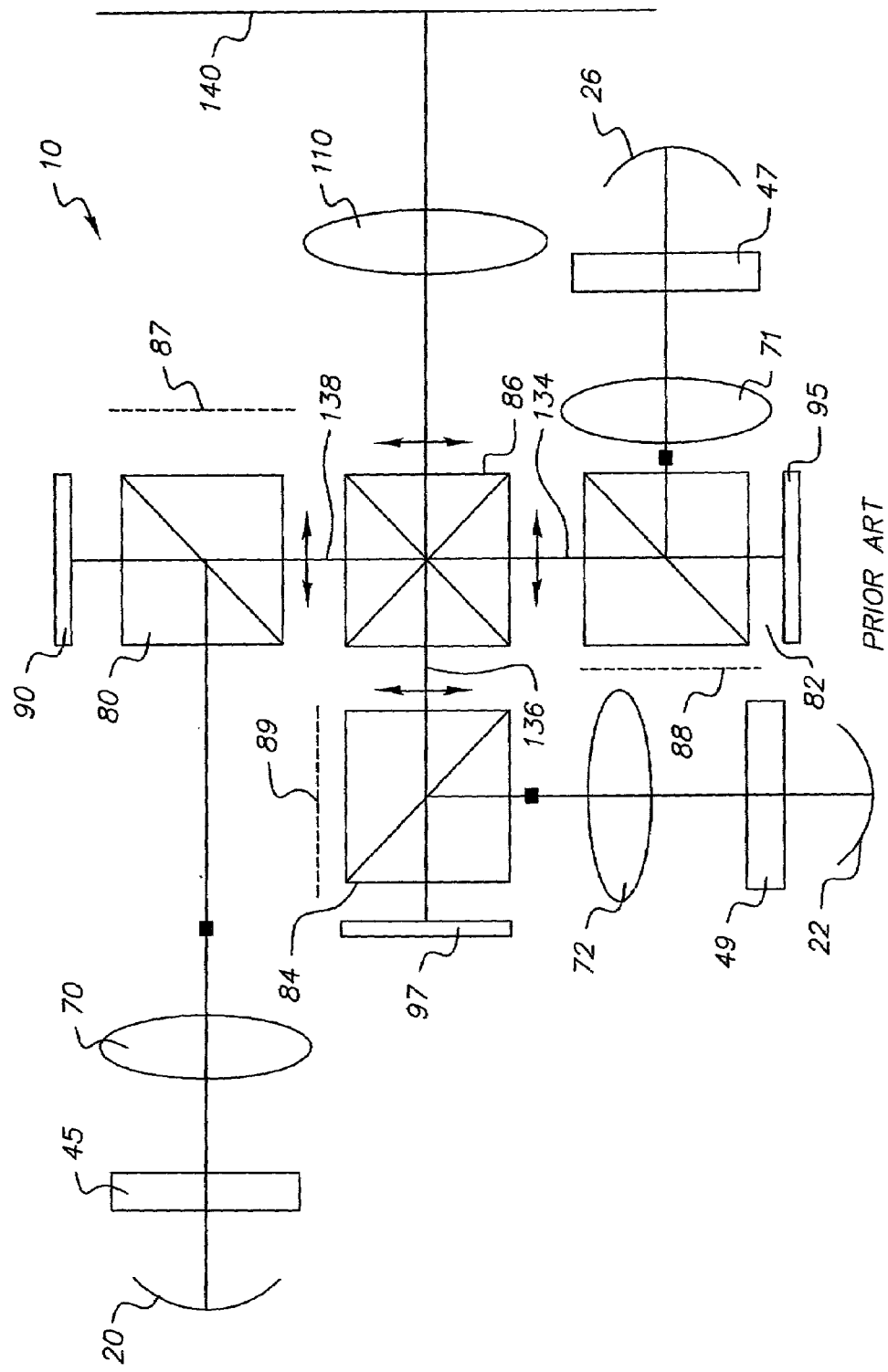
FIG. 1 is a schematic view of a prior art reflective spatial light modulator based printing system using three reflective LCD modulators and three independent light sources, all confined to a horizontal plane.

Referring now to FIG. 1, which is prior art from U.S. patent application Ser. No. 09/794,669, is a printer 10 with three light sources and three LCD modulators all contained in a single plane. Three illumination sources 20, 22, 26 direct blue, green, and red wavelengths of light, respectively, through respective uniformizing optics assemblies 45, 49, 47 and telecentric condenser lenses 70, 72, 71 to produce a uniform beam of each color. Each color of light is directed towards its respective polarizing beamsplitter prism 80, 84, 82. The prism divides the light into two different polarization states. The s-polarization state of light is directed towards LCD spatial light modulators 90, 97, 95 located on the high contrast side of the polarizing beamsplitting (PBS) prism. Voltage applied to each pixel of each modulator creates a first polarization modulated light beam, the p-polarized component of which is passed back through the polarizing beamsplitter prism to the x-cube combiner 86. The first 134, second 136, and third 138 modulated light beams are directed towards an x-cube 86, which combines the beams to form a complete image. The complete image is directed through a print lens 110 assembly to expose the photosensitive media 140. One or more modulators may be located at the corresponding location 87, 88, 89 on the alternate facet of the beamsplitting cube. However, this location for the modulator will provide an inherently lower contrast.

Commercially available x-cubes are designed to handle s-polarized light, not p-polarized light. Designing a custom x-cube for p-polarized light may be difficult and expensive. FIG. 1 also shows alternate locations 87, 89, 88 for the LCD. This location is the low contrast side of the beamsplitting prism, which although it may be adequate for printing on high contrast paper, is inadequate for movie film. Prior art of FIG. 1, although it confines the printer to a plane, has drawbacks in cost and availability of the x-cube or the contrast available from the system.

The contrast available from an LCD writer depends upon several elements:

Sheet polarizer contrast, Cpol=100

Contrast ratio of reflected light of PBS, Cpr=20 (Reflects 99% S, 5% P)

Contrast ratio of transmitted light of PBS, Cpt=95 (Transmits 95% P, 1% S)

Contrast ratio of LCD, Clcd=100

Contrast ratio of analyzer, Can=100

For the high contrast side of the prism, the contrast is given by $$1/((1/(Cpol*Cpr*Clcd))+(1/(Cpt*Can)))$$

$$1/((1/(100*20*100)=(1/(95*100)))=10000:1$$

For the lower contrast side of the prism, the contrast is given by $$1/((1/(Cpol*Cpt*Clcd)+(1/(Cpr*Can)))$$

$$1/((1/100*95*100)+(1/(20*100)))=2000:1$$

It can be seen that there can easily be a 5:1 difference in contrast ratio between the two sides of the prism. These values assumed above are optimistic. If the high contrast side is actually 200:1, then the low contrast side will be about 40:1, values more typically seen in actual systems. Contrast values of 100:1 to 150:1 are needed for the film writer.

Figure 2:
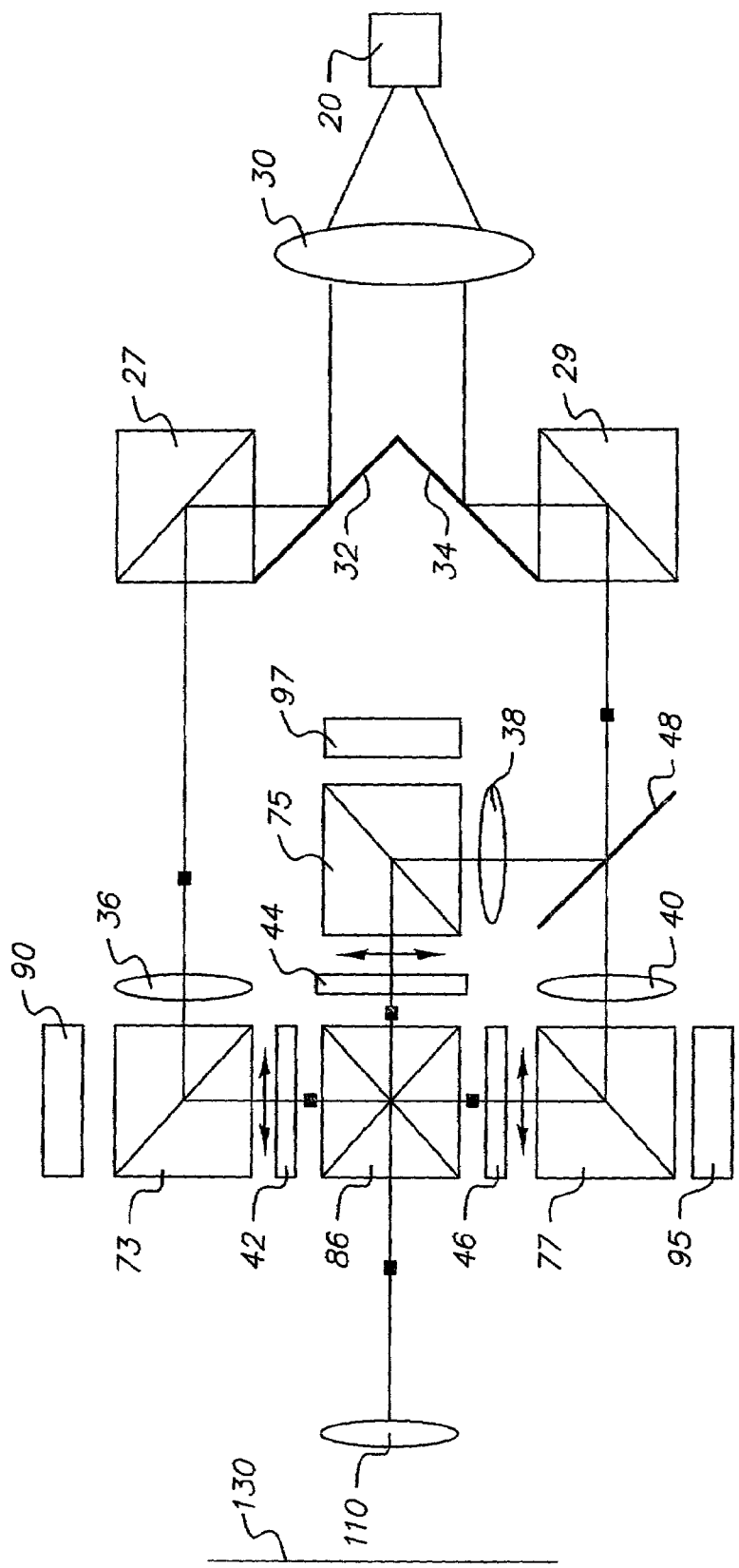
FIG. 2 is a schematic view of a projector using a single light source which is split into three beams and three reflective LCD modulators, all confined to a vertical plane.

FIG. 2 shows another three LCD single plane system but in this case it is designed as a projection system. The plane of the system is vertical, perpendicular to the plane of the tabletop or mounting surface. Such a large vertical structure makes it more vulnerable to vibration. Light from source 20 is collected by lens 30 and split into two components by dichroic mirrors 32 and 34. The blue beam goes upward to the polarizing beamsplitter/fold prism 27. The other beam containing both red and green components is directed through polarizing beamsplitter/fold prism 29. All beams are s-polarized at this point. Following the blue beam, it passes through relay lens 36 to a second polarizing beamsplitter cube with an LCD 90 on the high contrast side of the cube. (Similar components such as relay lenses 38, 40 and green fold mirror 75 and red fold mirror 77 are used in the other light paths.) The LCD rotates the plane of polarization to p-polarization and that light passes through the prism 73 and is directed to the x-cube combiner prism 86. Since standard x-cubes require spolarization, a half wave plate 42 is inserted between the polarizing beamsplitter prism and the x-cube to rotate the polarization back to s-polarization. The blue light is reflected from the dichroic surface inside the x-cube and travels to the print lens assembly 110 and is projected on the screen 130. Likewise, the red and green light are split by dichroic mirror 48 and then pass through optics similar to the blue beam to reach the screen.

Note that three half wave plates 42, 44, 46 must be used, each designed for a particular color. These wave plates need to be large and also must be very flat because they are used in the imaging portion of the optics. These characteristics make them very expensive and three different parts are required.

Figure 3A:
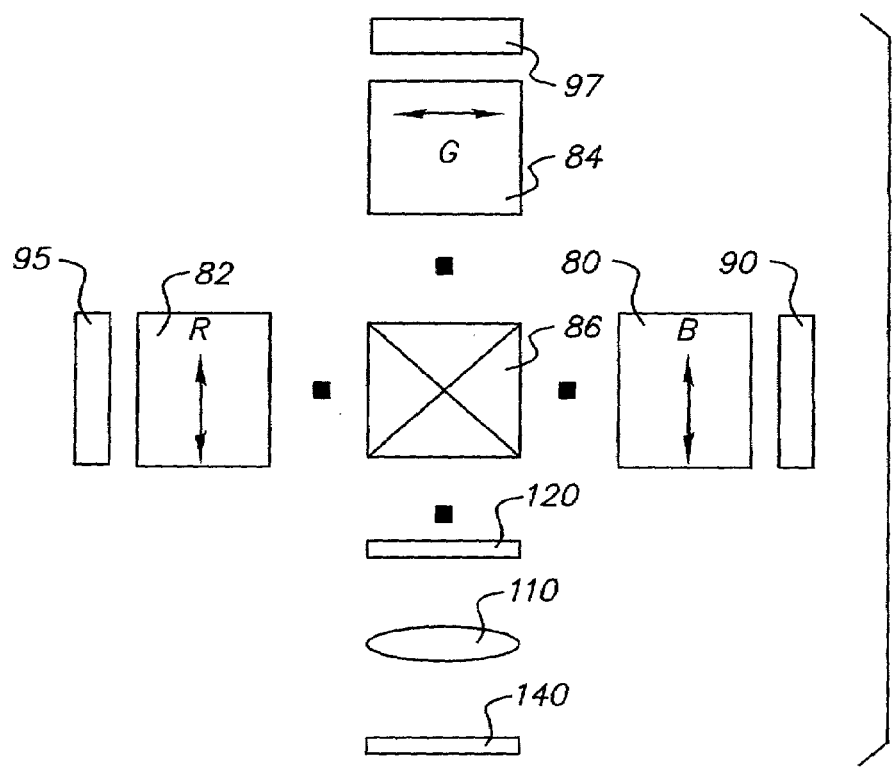
FIGS. 3a and 3b are schematic view of a reflective spatial light modulator based printing system according to the present invention using three reflective LCD modulators in one plane and three independent light sources in a second plane.
Figure 3B:
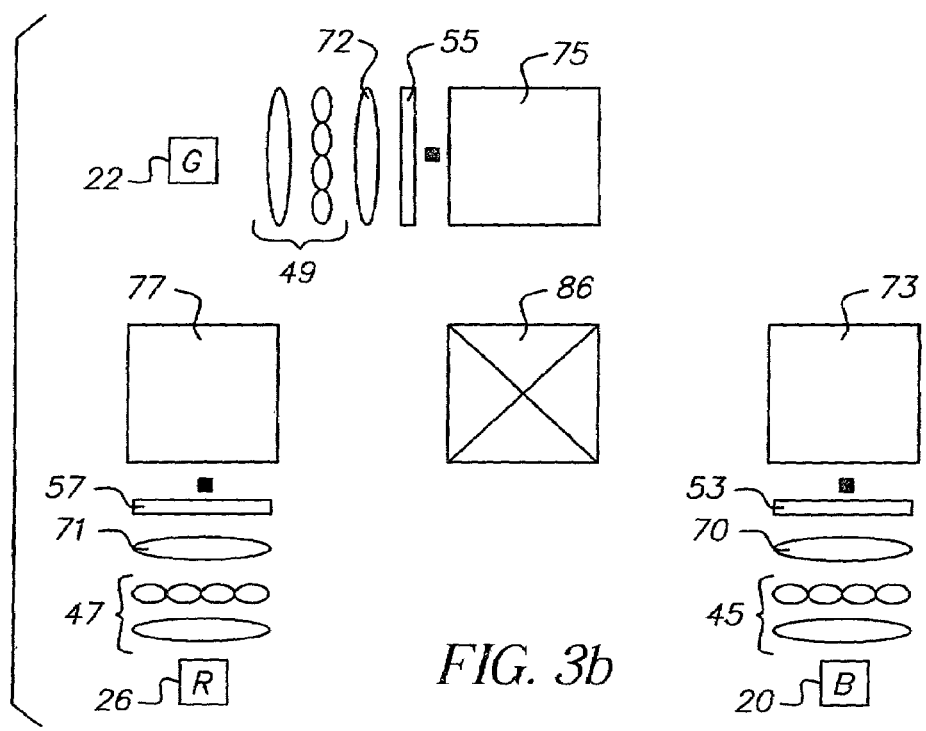

The present invention retains the high contrast image, keeps the optical path parallel to the table to minimize vibration effects and eliminates the need for expensive half wave plates. FIGS. 3*a* and 3*b* are a schematic drawings of the invention. Instead of confining all of the optics to a single horizontal plane or vertical plane, a two plane or two level approach is used. The illumination sources are on the upper level for ease of access and the beamsplitter and combining prisms as well as the modulators are on the lower level. Each level or plane can be separately aligned and the two mated together using pin registration. Unlike a laser/polygon system, the optical and mechanical tolerances are considerably relaxed. The optical parts do not have to be individually optically aligned. They can be set in place and reference mechanically.

The upper or second level contains at least three light sources 20, 26, 22. In a preferred embodiment, these sources are LED arrays, each of a different color, but they could be lasers or filtered broadband sources, or combinations of these types of sources. Starting with the blue source 20, the beam is uniformized by a uniformizer assembly 45, shown here as a collection lens and a lenslet array. An integrator bar could also be used as a uniformizer. A telecentric condenser lens 70 directs the uniformized beam to the spatial light modulator (SLM) to provide telecentric illumination. A polarizer 53 polarizes the beam to light which is s-polarized light with respect to the polarization beamsplitter prism (PBS) 80 on the level below. A system using a polarized laser would not require this polarizer and would not be subject to its losses. A fold mirror 73, or equivalently, a fold prism directs the s-polarized beam to the lower level. The dotted x-cube shown on the upper level schematic, indicates the location of the x-cube on the lower level. The beam then enters the polarization beamsplitter prism 80 on the lower level. The internal surface of this prism directs the s-polarized light to the SLM 90 which is typically a reflective LCD. The SLM is located on the high contrast side of the prism. Pixel information applied as voltages to the modulator pixel sites of the LCD rotate the plane of polarization of the input light and reflect this light back toward the PBS prism 80. The light emerging from the PBS prism is now p-polarized with respect to the PBS. This light is directed toward the x-cube combiner prism 86. Because of the differing orientations between the PBS prism and the x-cube, the light is spolarized with respect to the x-cube. Standard x-cubes are designed to handle spolarized light and therefore a half wave plate is not needed in this approach. The s-polarized light reflects off the internal dichroic surface of the x-cube and is directed to the print lens 110 and the photosensitive media 140. It can be seen that this approach will allow the high contrast side of the PBS to be used and will allow use of standard x-cubes without requiring wave plates. Having three light sources allows them to be set independently to match the film exposure requirements. Having three LCD modulators allows simultaneous exposure of the film to all three colors, thus providing a threefold increase in throughput over a single LCD, sequential printer as described in U.S. Pat. No. 6,215,547.

FIGS. 4*a*–4*d* shows planar layouts from three directions plus a three-dimensional view of a printer. It is similar to the printer described above and shown schematically in FIGS. 3*a* and 3*b*. It is different in that all three sources and illumination optics are directed outward from the x-cube. In addition, the polarization direction in the input optics is orthogonal to that in FIGS. 3*a* and 3*b*. It is horizontal instead of vertical. Nevertheless, it is still s-polarized entering from FIGS. 3*a* and 3*b*, the polarizers 53, 55, and 57 need to be rotated 90 degrees. Although the approach of FIGS. 4*a*–4*d* has a larger footprint than that of FIGS. 3*a* and 3*b*, it has the advantage that mechanical interference between large sources is effectively eliminated. FIG. 4*a* is a top view of the system. FIGS. 4*b* and 4*c* are side views. FIG. 4*d* is a three dimensional view. The output polarizer 120 and print lens assembly 110 are not shown for clarity, but they would occupy the same locations as in FIGS. 3*a* and 3*b*.

Figure 5A:
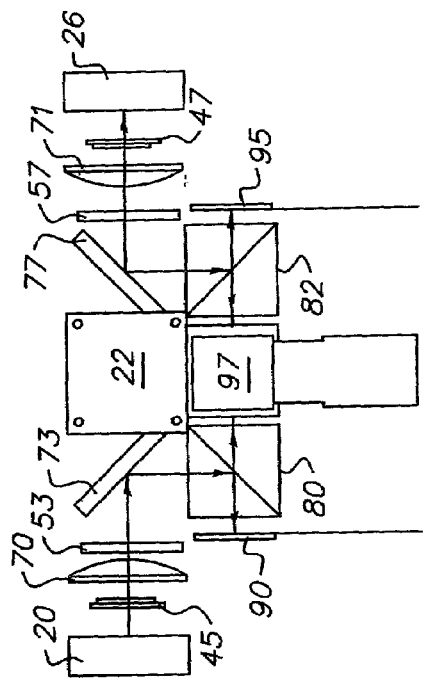
FIG. 5a is a top view of a printer wherein the light sources and illumination optics are oriented radially outward.
Figure 5C:
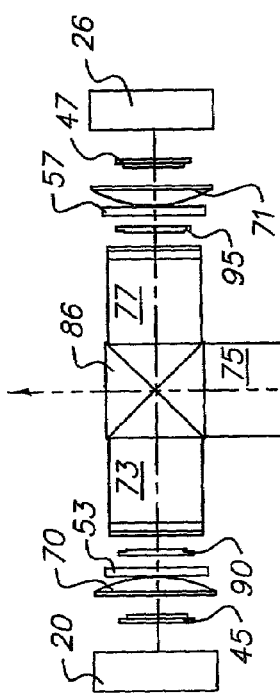
FIGS. 5b and 5c are side views of the illumination optics oriented outward from the x-cube combiner.
Figure 5B:
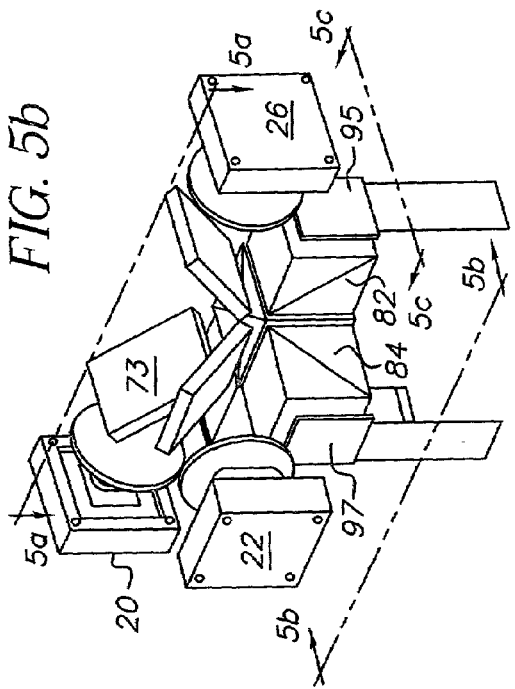
Figure 5D:
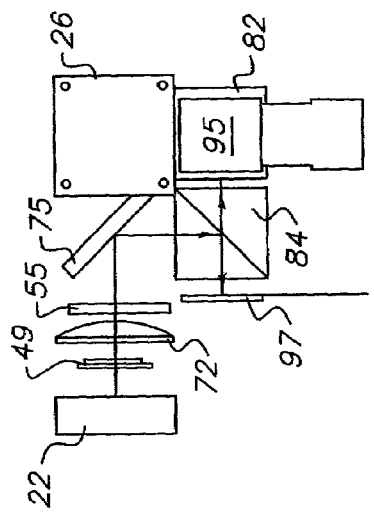
FIG. 5d is a three-dimensional view of a two level printing system showing three reflective LCD modulators and x-cube combiner in one plane, and three independent light sources in a second plane.
Figure 6A:
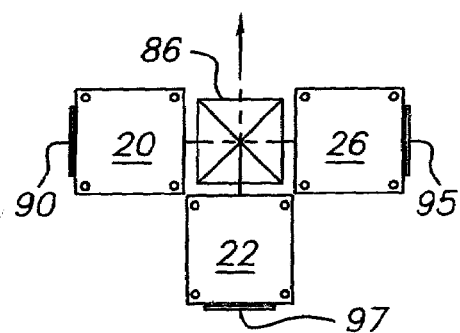
FIG. 6a is a top view of an alternate two level printer design where the illumination optics are oriented vertically from the x-cube combiner and the beamsplitter prisms.
Figure 6B:
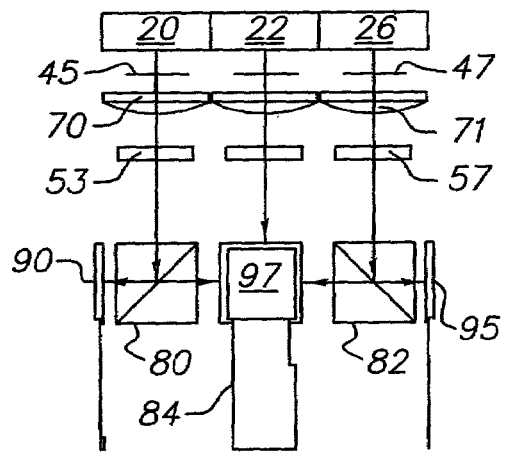
FIGS. 6b and 6c are side views of an alternate two level printer design where the illumination optics are oriented vertically from the x-cube combiner and the beamsplitter prisms.
Figure 6C:
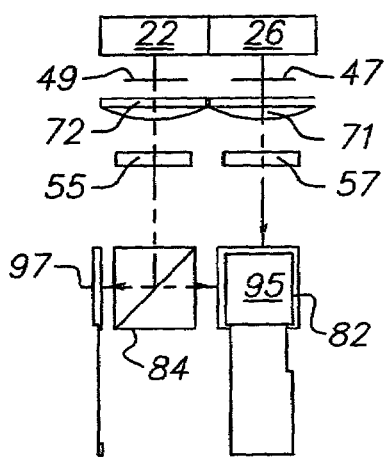
Figure 6D:
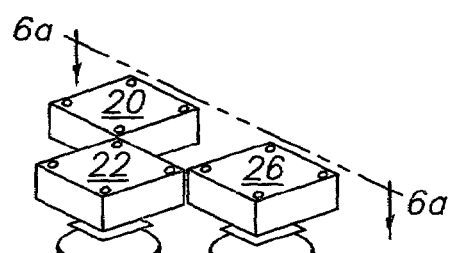
FIG. 6d is a three-dimensional view of a two level printing system showing three reflective LCD modulators and x-cube combiner in one plane, and three independent light sources in a second plane.
Figure 6D:
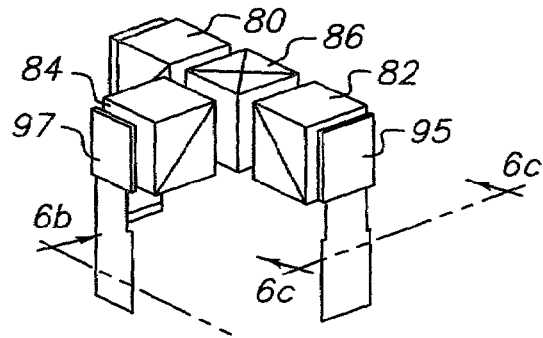

FIGS. 5*a*–5*d* show planar layouts from three directions plus a three-dimensional view of an alternate configuration printer. It is similar to the printer described above and shown schematically in FIGS. 3*a* and 3*b*. It is different in that all three sources and illumination optics are directed radially outward from the x-cube. In addition, the polarization direction in the illumination optics is orthogonal to that in FIGS. 3*a*, 3*b*, and FIGS. 4*a*–4*d*. The polarization direction is horizontal instead of vertical. Nevertheless, it is still spolarized entering the PBS and also s-polarized with respect to the x-cube. To accomplish this polarization difference from FIGS. 3*a* and 3*b*, the polarizers 53, 55, 57 simply need to be rotated 90 degrees from the configuration of FIGS. 3*a* and 3*b*. Although the approach of FIGS. 5*a*–5*d* has a somewhat larger footprint than that of FIGS. 3*a* and 3*b*, it has the advantage that mechanical interference between large sources is effectively eliminated. FIG. 5*a* is a top view of the system. FIGS. 5*b* and 5*c* are side views. FIG. 5*d* is a three-dimensional view. Again, the output polarizer 120 and print lens 110 are not shown for clarity, but they would occupy the same locations as in FIGS. 3*a* and 3*b*.

FIGS. 6*a*–6*d* show another alternate configuration from the two level printer of FIG. 3*a*, and FIGS. 4*a*–4*d*. In this case the lower level is the same as the two level printer described. The fold mirrors or prisms have been removed from the upper level and the sources and illumination optics are mounted vertically. It can be visualized as a one story building with three chimneys. Although it may be more susceptible to vibration than the two level structure, the two level structure of FIGS. 3*a* and 3*b* can run into mechanical interference problems on the upper level depending upon source size. The vertical source mounting leaves the sources further separated and can avoid mechanical interference. It has the smallest footprint of the three configurations. It can also offer a heat advantage for sources such as tungsten, or xenon, in that the hot source is further away from the rest of the optics.

The blue source 20 is uniformized by the optics 45 and relayed by the condenser lens 70 to the SLM 90 via the polarizer 53 and the PBS 80. The PBS and the SLM are located on the lower level as before. The red and green beams are handled in a similar manner. The three modulated beams are combined with an x-cube 86 using s-polarization and the output beam is passed through an analyzer 120 (not shown), a print lens assembly 110 (not shown) and is imaged onto a photosensitive media 140 (not shown.) These component locations are the same as shown in FIGS. 3a and 3b.

It should be understood for the printers shown in FIGS. 3a, 3b, 4a–d, 5a–d, and 6a–d that the light sources can be LED arrays, lasers, or broadband sources with filters, or any combination. For example, they could be a red laser, a tungsten lamp filtered for green and a blue LED array. Likewise, the uniformizer can use a lenslet array or an integrator bar, or even an integrating sphere. The polarizing beamsplitter can be a prism or a wire grid. The polarizer can be a sheet plastic device or a wire grid or even another PBS prism. The spatial light modulator can be any one of a number of area modulators including digital micromirror devices. The combining function of the x-cube can be accomplished by two separate dichroic prisms or dichroic mirrors.

It should also be understood that the same approaches shown in FIGS. 3a, 3b, 4a–d, 5a–d, and 6a–6d can be used for color projection displays rather than color printers, but certain design parameters would change because the receptor is now the human eye and not photographic film. It should further be understood that although the optical planes are generally shown as horizontal, they could also be oriented vertically, or in any direction.

The invention has been described in detail with particular reference to certain preferred embodiments thereof, but it will be understood that variations and modifications can be effected within the scope of the invention.

PARTS LIST

10. Printer system
20. Light source
22. Light source
26. Light source
27. Fold prism
29. Fold prism
30. Collimating lens
32. Blue reflecting mirror
34. Red and green reflecting mirror
36. Relay lens
38. Relay lens
40. Relay lens
42. Half wave plate
44. Half wave plate
45. Uniformizing optics
46. Half wave plate
47. Uniformizing optics
48. Green reflecting mirror
49. Uniformizing optics
53. Blue input polarizer
55. Green input polarizer
57. Red input polarizer
70. Telecentric condenser lens
71. Telecentric condenser lens
72. Telecentric condenser lens
73. Blue fold mirror or prism
75. Green fold mirror or prism
77. Red fold mirror or prism
80. Blue polarizing beamsplitter
82. Red polarizing beamsplitter
84. Green polarizing beamsplitter
86. X-cube combiner
87. Alternate LCD location
88. Alternate LCD location
89. Alternate LCD location
90. Blue reflective LCD modulator
95. Red reflective LCD modulator
97. Green reflective LCD modulator
110. Print lens assembly
120. Output polarizer (analyzer)
130. Screen
134. Modulated light beam
136. Modulated light beam
138. Modulated light beam
140. Photosensitive media

What is claimed is:

1. A two level image writer for forming an image from digital data onto a photosensitive medium, said apparatus comprising:
    an illumination system in a first level for providing incident light beams, said illumination system comprising:
        a first source for emitting a first polarized light beam having a first color;
        a second source for emitting a second polarized light beam having a second color;
        a third source for emitting a third polarized light beam having a third color;
    fold mirrors for directing each beam to a second level;
    three polarizing beamsplitters on said second level which receive said polarized beams from said fold mirrors, wherein each polarizing beamsplitter isolates polarization states of each of said first, second, and third polarized light beams;
    three spatial light modulators on said second level, each comprising an array of pixel sites, wherein each pixel site modulates said first, second, and third polarized light beam from said polarizing beamsplitter prisms to form an array of image pixels according to said digital data;
    a dichroic combiner for combining said three modulated light beams into a single writing beam;
    wherein said first, second, and third light sources include respectively a red Light Emitting Diode (LED) array, a green LED array, and a blue LED array; and
    wherein said spatial light modulators are reflective Liquid Crystal Devices (LCD).

2. A two level image writer as in claim 1 wherein said first, second, and third light sources comprise a collimator, uniformizer and polarizer.

3. A two level image writer as in claim 1 wherein said spatial light modulators are gated light valves.

4. A two level image writer as in claim 1 wherein said polarizing beamsplitters are prisms.

5. A two level image writer as in claim 1 wherein said polarizing beamsplitters are wire-grid polarizers.

6. A two level image writer as in claim 1 wherein said dichroic combiner is an x-cube.

7. A two level image writer as in claim 1 wherein a polarizer is located between each of said light sources and each of said polarizing beamsplitters.

8. A two level image writer as in claim 1 wherein said photosensitive media is a negative film.

9. A two level image writer as in claim 1 wherein said photosensitive media is an intermediate negative film.

10. A two level image writer as in claim 1 wherein said photosensitive media is a print film.

11. A two level image writer as in claim 1 wherein said photosensitive media is a reversal film.

12. A two level image writer as in claim 1 wherein said photosensitive media is a negative paper.

13. A two level image writer as in claim 1 wherein said photosensitive media is a reversal paper.

14. A two level image writer as in claim 1 wherein said photosensitive media is an electrophotographic media.

15. A two level image writer as in claim 1 wherein said first, second, and third light beam is maintained in s-polarization to match a required polarization of said combiner and utilize a high contrast side of said polarization beamsplitting prisms.

16. A two level imaging apparatus comprising:
a first Light Emitting Diode (LED) array light source on a first level for generating a first light beam;
a first polarizer on said first level for converting said first light beam into an S-polarization state;
a first reflecting mirror which reflects said first polarized light beam to a first polarizing beamsplitter located on a second level;
wherein said first polarizing beamsplitter reflects said S-polarized light to a first spatial Liquid Crystal Device (LCD) light modulator located on said second level;
wherein said first (LCD) spatial light modulator rotates a portion of said S-polarized light beam according to first data input to create a first imaging beam, and reflects said first imaging beam;
wherein said first imaging beam is transmitted through said first polarization beamsplitter to an x-cube located on said second level; and wherein said first imaging beam is directed through said x-cube to an imaging plane.

17. A two level imaging apparatus as in claim 16 wherein a second light source on said first level generates a second light beam;
a second polarizer on said first level converts said second LED light beam into a S-polarization state;
a second reflecting mirror which reflects said second polarized light beam to a second polarizing beamsplitter located on said second level;
wherein said second polarizing beamsplitter reflects said S-polarized light to a second LCD spatial light modulator located on said second level;
wherein said second spatial light modulator rotates a portion of said S-polarized light beam according to a second data input to create a second imaging beam and reflects said second imaging beam;
wherein said second imaging beam is transmitted through said second polarization beamsplitter to said x-cube; and
wherein said x-cube directs said second imaging beam to said imaging plane.

18. A method for forming an image from digital data onto an image plane comprising:
emitting a first polarized light beam having a first color from a first source located on a first level;
emitting a second polarized light beam having a second color from a second source located on said first level;
emitting a third polarized light beam having a third color from a third source located on said first level;
directing each of said polarized beams to a second level;
isolating polarization states of each of said first, second, and third polarized light beams;
modulating said first, second, and third polarized light beam to form modulated light beams;
combining said three modulated light beams into a single beam for producing said image at said image plane;
wherein said first, second, and third light sources include respectively a red Light Emitting Diode (LED) array, a green LED array, and a blue LED array; and
wherein said spatial light modulators are reflective Liquid Crystal Devices (LCD).

19. A two level image apparatus for forming an image from digital data onto an image plane, said apparatus comprising:
an illumination system in a first level for providing incident light beams, said illumination system comprising:
a first source for emitting a first polarized light beam having a first color;
a second source for emitting a second polarized light beam having a second color;
a third source for emitting a third polarized light beam having a third color;
fold mirrors for directing each beam to a second level;
two polarizing beamsplitters on said second level which receive said polarized beams from said fold mirrors, wherein each polarizing beamsplitter isolates polarization states of each of said first and second polarized light beams;
two spatial light modulators on said second level, each comprising an array of pixel sites, wherein each pixel site modulates said first and second polarized light beams from said polarizing beamsplitter prisms to form an array of image pixels according to said digital data;
a dichroic combiner for combining said modulated light beams into a single writing beam;
wherein said first, second, and third light sources include respectively a red Light Emitting Diode (LED) array, a green LED array, and a blue LED array: and
wherein said spatial light modulators are reflective Liquid Crystal Devices (LCD).

20. A two level image apparatus for forming an image from digital data onto an image plane, said apparatus comprising:
an illumination system in a first level for providing incident light beams, said illumination system comprising:
a first source for emitting a first polarized light beam having a first color;
a second source for emitting a second polarized light beam having a second color;
a third source for emitting a third polarized light beam having a third color;
reflecting devices for directing each beam to a second level;
three polarizing beamsplitters on said second level which receive beams from said reflecting devices, wherein each polarizing beamsplitter isolates polarization states of each of said first, second and third polarized light beams;
three spatial light modulators on said second level, each comprising an array of pixel sites, wherein each pixel site modulates said first, second, and third polarized light beam to form an array of image pixels according to said digital data;
a dichroic combiner for combining said three modulated light beams into a single writing beam;

wherein said first, second, and third light sources include respectively a red Light Emitting Diode (LED) array, a green LED array, and a blue LED array; and wherein said spatial light modulators are reflective Liquid Crystal Devices (LCD).

21. A two level image writer as in claim 20 wherein said reflecting devices are prisms.

22. A two level image apparatus for forming an image from digital data onto an image plane, said apparatus comprising:
- an illumination system in a first level for providing incident light beams, said illumination system comprising:
  - a first source for emitting a first polarized light beam having a first color;
  - a second source for emitting a second polarized light beam having a second color;
  - a third source for emitting a third polarized light beam having a third color;
  - reflecting devices for directing each beam to a second level;
- three polarizing beamsplitters on a second level which receive polarized light beams from said first, second and third light sources respectively, wherein each polarizing beamsplitter isolates polarization states of each of said first, second and third polarized light beams;
- three spatial light modulators on said second level, each comprising an array of pixel sites, wherein each pixel site modulates said first, second, and third polarized light beam to form an array of image pixels according to said digital data;
- a dichroic combiner for combining said three modulated light beams into a single writing beam;
- wherein said first, second, and third light sources include respectively a red Light Emitting Diode (LED) array, a green LED array, and a blue LED array; and
- wherein said spatial light modulators are reflective Liquid Crystal Devices (LCD).

23. A two level image apparatus for forming an image from digital data onto an image plane, said apparatus comprising:
- an illumination system in a first level for providing incident light beams, said illumination system comprising:
  - a first source for emitting a first polarized light beam having a first color;
  - a second source for emitting a second polarized light beam having a second color;
  - a third source for emitting a third polarized light beam having a third color;
  - reflecting devices for directing each beam to a second level;
- three polarizing beamsplitters on a second level which receive polarized light beams from said first, second and third light sources respectively, wherein each polarizing beamsplitter isolates polarization states of each of said first, second and third polarized light beams;
- three spatial light modulators on said second level, each comprising an array of pixel sites, wherein each pixel site modulates said first, second, and third polarized light beam to form an array of image pixels according to said digital data;
- a dichroic combiner for combining said three modulated light beams into a single writing beam;
- wherein said first, second, and third light sources include respectively a red Light Emitting Diode (LED) array, a green LED array, and a blue LED array; and
- wherein said spatial light modulators are reflective Liquid Crystal Devices (LCD).

* * * * *